United States Patent
Bocca et al.

(10) Patent No.: US 10,532,719 B2
(45) Date of Patent: Jan. 14, 2020

(54) BLUETOOTH LOW ENERGY (BLE) PASSIVE VEHICLE ACCESS CONTROL SYSTEM FOR DEFENDING THE SYSTEM AGAINST RELAY ATTACKS AND METHOD THEREOF

(71) Applicant: Robert Bosch GmbH, Stuttgart (DE)

(72) Inventors: Maurizio Bocca, Sunnyvale, CA (US); Vivek Jain, Sunnyvale, CA (US); Christoph Lang, Sunnyvale, CA (US); Huang Lee, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 85 days.

(21) Appl. No.: 15/591,461

(22) Filed: May 10, 2017

(65) Prior Publication Data
US 2018/0186332 A1    Jul. 5, 2018

Related U.S. Application Data

(60) Provisional application No. 62/440,667, filed on Dec. 30, 2016.

(51) Int. Cl.
*B60R 25/24* (2013.01)
*H04L 29/06* (2006.01)

(52) U.S. Cl.
CPC ........ *B60R 25/24* (2013.01); *B60R 2325/101* (2013.01); *B60R 2325/108* (2013.01); *H04L 63/1441* (2013.01)

(58) Field of Classification Search
CPC .............. B60R 25/24; B60R 2325/101; B60R 2325/108; H04L 63/1441; H04L 63/1466;
(Continued)

(56) References Cited

U.S. PATENT DOCUMENTS 8,774,721 B2 *  7/2014  Hertel .................. H04W 76/14
                                                        455/41.3
9,198,214 B2 * 11/2015  Hertel .................. H04W 76/14
(Continued)

FOREIGN PATENT DOCUMENTS

DE      102014010357 A1    1/2015
EP           2612795 A1    7/2013
(Continued)

*Primary Examiner* — Nay Tun
(74) *Attorney, Agent, or Firm* — Maginot, Moore & Beck LLP

(57) ABSTRACT

A Bluetooth Low-Energy (BLE) passive vehicle access control system integrated into a vehicle and an external device to defend the system against relay attacks is provided. The system includes at least one of a motion detector, a microprocessor, or a barometric pressure sensor. The motion detector is configured to detect and distinguish various types of motion and vibration. The motion detector is further configured to distinguish between a true motion event and a false motion event. The microprocessor comprises a set of computer executable instructions including a TX power profiling is capable of modulating the transmitted (TX) power level to create at a receiving end of a communication having link in the vehicle a RX power level (RSS) profile that serves as an authentication. The barometric pressure sensor is configured to measure barometric pressure which ultimately translates the measured barometric pressure into altitude value and distinguish the altitude value of the vehicle and of the external device is either matched or different.

4 Claims, 3 Drawing Sheets

(58) Field of Classification Search
CPC . G07C 2009/00555; G07C 2009/0096; H04W 4/40; H04W 12/08; H04W 4/80; H04W 12/00503; H04W 12/00504; H04W 4/02; H04W 4/021; H04W 4/027; H04W 12/12; H04W 84/18
See application file for complete search history.

(56) References Cited

U.S. PATENT DOCUMENTS

| | | | | |
|---|---|---|---|---|
| 9,244,442 | B2* | 1/2016 | Jansseune | G05B 11/01 |
| 9,794,753 | B1* | 10/2017 | Stitt | H04B 17/318 |
| 10,039,145 | B2* | 7/2018 | Alipour | H04W 76/10 |
| 2006/0136997 | A1* | 6/2006 | Telek | G01S 11/06 |
| | | | | 726/5 |
| 2010/0250497 | A1* | 9/2010 | Redlich | F41H 13/00 |
| | | | | 707/661 |
| 2014/0244514 | A1* | 8/2014 | Rodriguez | G06Q 20/10 |
| | | | | 705/71 |
| 2014/0258110 | A1* | 9/2014 | Davis | G06Q 20/227 |
| | | | | 705/41 |
| 2014/0282947 | A1* | 9/2014 | Ignatchenko | H04W 12/06 |
| | | | | 726/6 |
| 2014/0289822 | A1* | 9/2014 | Wilson | G06Q 20/42 |
| | | | | 726/5 |
| 2014/0289833 | A1* | 9/2014 | Briceno | H04L 63/08 |
| | | | | 726/7 |
| 2014/0375420 | A1* | 12/2014 | Seiberts | B60R 25/2072 |
| | | | | 340/5.31 |
| 2016/0125675 | A1* | 5/2016 | Ziller | B60R 25/24 |
| | | | | 340/5.72 |
| 2017/0150533 | A1* | 5/2017 | Alipour | H04W 76/10 |
| 2017/0255938 | A1* | 9/2017 | Biegun | G06Q 20/3278 |
| 2017/0278330 | A1* | 9/2017 | Buttolo | G07C 9/00119 |
| 2017/0303090 | A1* | 10/2017 | Stitt | H04B 17/318 |
| 2017/0317990 | A1* | 11/2017 | Kim | H04L 9/0825 |
| 2018/0056939 | A1* | 3/2018 | van Roermund | B60R 25/04 |
| 2018/0099643 | A1* | 4/2018 | Golsch | B60R 25/24 |
| 2018/0103414 | A1* | 4/2018 | Golsch | B60R 25/24 |
| 2018/0130275 | A1* | 5/2018 | Odejerte, Jr. | G07C 9/00309 |

FOREIGN PATENT DOCUMENTS

| | | |
|---|---|---|
| EP | 2942758 A1 | 11/2015 |
| WO | 2014125353 A1 | 8/2014 |
| WO | 2014187767 A1 | 11/2014 |

* cited by examiner

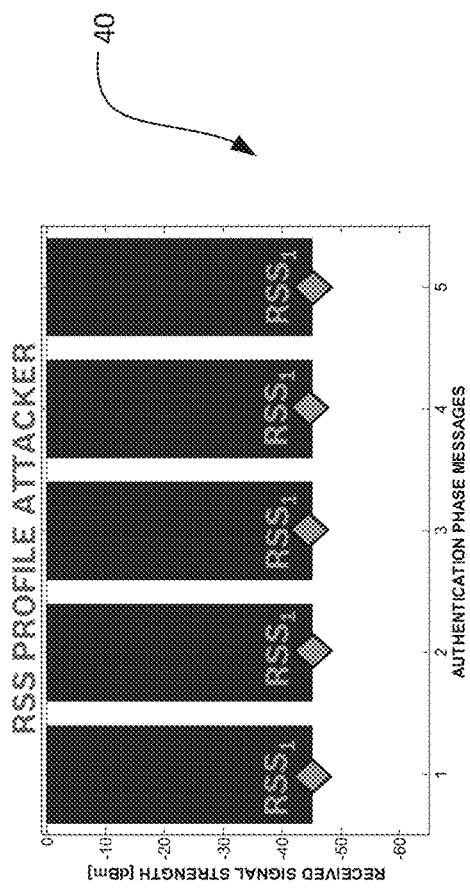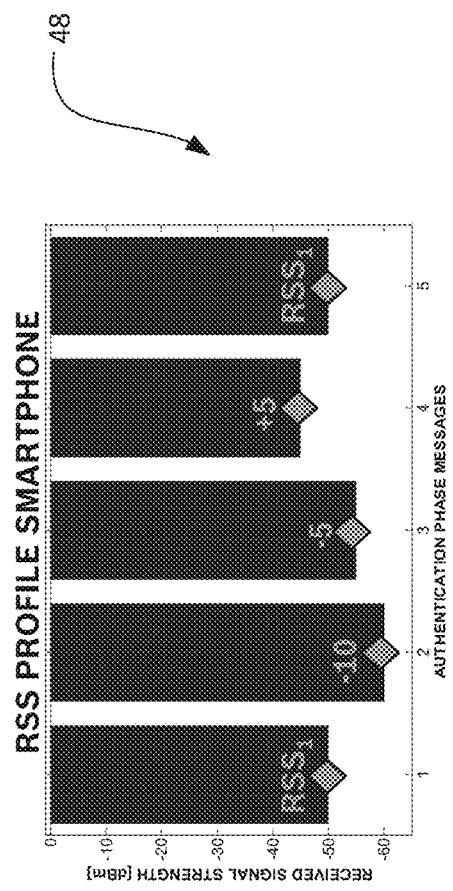
FIG. 2A
FIG. 2B

BLUETOOTH LOW ENERGY (BLE) PASSIVE VEHICLE ACCESS CONTROL SYSTEM FOR DEFENDING THE SYSTEM AGAINST RELAY ATTACKS AND METHOD THEREOF

CROSS-REFERENCE TO RELATED APPLICATION

This application claims priority to a U.S. provisional patent application Ser. No. 62/440,667, filed Dec. 30, 2016, the contents of which are incorporated herein by reference as if fully enclosed herein.

FIELD

This disclosure relates generally to anti-relay attack access control systems and, more particularly, to a BLE passive vehicle access control system for defending the system against relay attacks and method thereof.

BACKGROUND

Unless otherwise indicated herein, the materials described in this section are not prior art to the claims in this application and are not admitted to the prior art by inclusion in this section.

Standard Passive Entry Systems (PES) key fobs typically operate on two radio frequencies (RF). For example, low frequency (LF) communication is used for proximity detection and localization required for the Comfort Entry Go (CEG) functionality. Another frequency, such as ultra-high frequency (UHF), is used to extend the communication range for Remote Keyless Entry (RKE) functionality. Passive Entry Systems (PES) have strict proximity/localization requirements. For example, with a PES system providing RKE and CEG, a vehicle unlocks the doors only when a driver or a person authorized to access is within a perimeter at ~2 m from the vehicle. The PES/CEG system further allows the user or the driver to start the engine only when the key fob is inside the vehicle. These localization requirements are hard to satisfy for any wireless technology. Therefore, the current systems require LF, e.g. 125 kHz, antennas both inside and outside the vehicle along with optimal power control to satisfy the proximity/localization requirements. On the other hand, communication link from the key fob to the vehicle for RKE (i.e., when the user explicitly presses the lock/unlock button on the key fob) is based on UHF to satisfy both the range requirement (~50 m) and the antenna size requirement (i.e., the antenna needs to fit in a small key fob).

These systems are vulnerable to relay attacks. In a relay attack, an attacker uses a relay apparatus such as an analog amplifier to amplify the received signals from either the PES on the vehicle or the key fob and retransmit the received signals back to either the system or the key fob. This attack makes the key fob believes the driver is in proximity of the vehicle, so that the key fob sends an access control command in UHF to the vehicle, which in turn unlocks the vehicle. In more advanced attacks, one attacker may also employ an advanced relay apparatus capable of measuring the power of the received signals and replicating the signals by adjusting the transmit power accordingly.

Electronic and wearable devices with integrated keyless passive entry systems are becoming widely used due to several advantages. For example, the user does not require to rely on key fobs for the access of the vehicle and further the user does not require to actively interact with the device nor the key fob with integrated PES in order to access the vehicle. However, these devices with integrated PES are also vulnerable to relay attacks.

Therefore, there is a long felt need to provide an improved passive vehicle access control system to defend the system against relay attacks.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to a BLE passive vehicle access control system comprise a vehicle, an external device communicatively coupled to the vehicle, and a processor communicatively coupled the vehicle to the external device wherein the external device is configured to modulate a transmitted (TX) power level of successive transmissions and generate a corresponding RX power level (RSS) profile identical to the modulated TX power level of successive transmissions. The processor is configured to compare the RSS profile with a pre-determined secure patterns stored in a non-transitory computer-readable storage media. The processor is further configured to disable a communication between the external device and the vehicle if the RSS profile is constant. The system further comprises a sensor for detecting a perimeter, and the processor coupled to the sensor receives the detected perimeter and disables a communication between the external device and the vehicle. The sensor is at least one of a motion detector or a barometric pressure sensor. The motion detector detects the perimeter comprising an acceleration data, the processor further compares the acceleration data with a set of pre-determined criteria stored in non-transitory computer-readable storage media and distinguishes the acceleration data is either a true event or a false event. The processor disables the communication between the external device and the vehicle when the acceleration data does not match with the pre-determined criteria, is defined as the false event. The barometric pressure sensor measures barometer pressure of at least one of the external device and the vehicle, the processor disables the communication between the external device and the vehicle if the barometer pressure of the external device does not match with the barometer pressure of the vehicle.

According to another exemplary embodiment of the disclosure, a non-transitory computer-readable storage medium having stored therefore on a computer program for defending a system against relay attacks, the computer program comprises a set of instructions for causing a processor to perform measure a RX power level (RSS) profile, compare the measured RSS profile with a pre-determined secure patterns, and disable a communication between the receiving device and a transmitting device if the measured RSS profile is constant. The non-transitory computer-readable storage medium further comprises modulating a transmitted (TX) power level of successive transmissions and creating RX power level (RSS) profile identical to the modulated TX power level. The non-transitory computer-readable storage medium further comprises detecting a perimeter generated by at least one of the receiving device and the transmitting device wherein the perimeter is at least one of an acceleration data and a barometric pressure value. The non-transitory computer-readable storage medium further comprises comparing the acceleration data with a set of pre-determined criteria and distinguishing the acceleration data is either a true event or a false event. The non-transitory computer-readable storage medium further disables the communication between the receiving device and transmitting device if the acceleration data does not match with the pre-determined criteria, defining the false event. The non-transitory computer-readable storage medium further disables the communication between the receiving device and the transmitting device if the barometer pressure value of the receiving device does not match with the barometer pressure value of the receiving device.

According to yet another exemplary embodiment of the disclosure, an access control system for a vehicle comprises a sensor for detecting data including at least one of a motion value, a vibration value, and a barometric pressure value of an external device and a processor in communication with the sensor is configured to disable a connection between the external device and the vehicle. The processor receives detected data from the sensor and compares the detected data with a pre-determined criteria wherein the pre-determined criteria is at least one of minimum motion value, maximum motion value, and no motion value. The processor is further configured to measure a RX power level (RSS) profile, compare the measured RSS profile with a pre-determined secure patterns, and disable the connection between the external device and the vehicle if the measured RSS profile is constant. The processor receives the detected data from the sensor and is further configured to translate the detected data into an altitude value, compare the altitude value of the external device with an altitude value of the vehicle, and disable the connection between the external device and the vehicle if the altitude value of the external device and the altitude value of the vehicle is not matched.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein:

FIG. 2A is a graph showing RSS profile data in accordance with the disclosure;

FIG. 2B is another graph showing RSS profile data in accordance with the disclosure.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
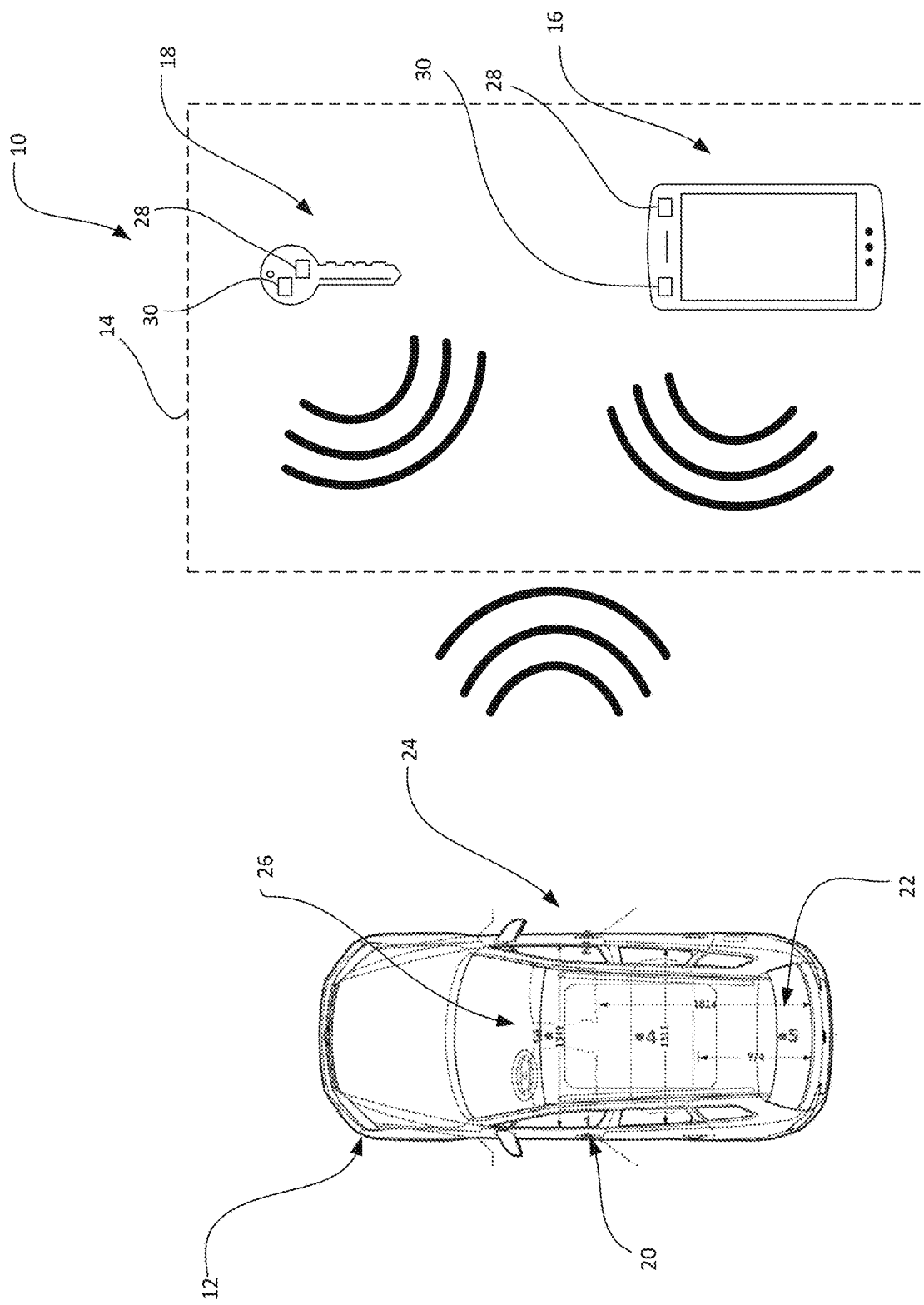
FIG. 1 is a block diagram of a system according to a described embodiment of the disclosure.

FIG. 1 illustrates a system 10 in accordance with a disclosure. The system 10 is a passive vehicle access control system comprises a vehicle 12 and an external device 14 communicatively coupled to the vehicle 12 via a communication link. As illustrated, the communication link is a Bluetooth (BT) communication protocol and standard including a Bluetooth Low Energy (BLE) communication protocol. The external device 14 may be any BLE-enabled device such as a key/card device or any other client device. The external device 14 also includes passive vehicle access control functionality generally known to the industry. The key/card device may be a key fob, key card, a client device, an access key, an access card, a smart card, a smart key, or any suitable BLE-enabled device. The client device may be a smart phone, a personal digital assistant (PDA), a tablet, a laptop, a portable personal computer, a phablet, a wearable device, a thin device, a thick device, an entertainment device, an infotainment device, or any suitable portable/wearable device including Bluetooth low energy protocol or any suitable BT communication protocol. As illustrated, the key/card device is a smart key 18 and the client device is a phablet 16, both with BLE passive vehicle access control. A plurality of wireless transceivers 20, 22, 24, 26 comprises integrated antenna are installed at various locations in and around the vehicle 12. In one embodiment, the antenna is a directional antenna. Depending on the application, other suitable antenna either integrated into or coupled to the transceivers. For example, wireless transceiver 20 and 24 are installed near the handle of the front doors. Wireless transceiver 22 is installed near the rear end of the vehicle, whereas wireless transceiver 26 is installed at the front end of the vehicle. For instance, the wireless transceiver 26 is located at a location near to a dashboard. As can be seen, except the wireless transceiver 26 that faces toward the inside of the vehicle, the rest of the wireless transceivers 20, 22, 24 are facing outwardly. Any number of transceivers 20, 22, 24, 26 periodically transmit signals such as advertisement beacons to announce the presence of the vehicle 12 to at least one of the smart key 18 or the phablet 16 carried by a driver or an authorized person of the vehicle 12. When one of the smart key 18 or the phablet 16 receives these advertisement beacons, one of the smart key 18 or the phablet 16 starts or initiates the connection and authentication process with the vehicle 12 via for example the transceivers 20, 22, 24, 26. During this process, the vehicle 12 and one of the smart key 18 or the phablet 16 continuously exchange data packets. At the completion of this process, one of the smart key 18 or the phablet 16 periodically transmits beacons while either any number of the transceivers 20, 22, 24, 26 or a BLE-enabled passive vehicle access control device coupled to the transceivers 20, 22, 24, 26 measures Received Signal Strength (RSS) of these beacons in order to estimate the position of one of the smart key 18 or the phablet 16. The BLE-enabled passive vehicle access control device is also located on the vehicle 12. In some embodiments, more than one BLE-enabled passive vehicle access control device may be installed in the vehicle 12 and then coupled to any in-vehicle devices via any number of communication links. In some embodiments, the BLE enabled passive vehicle access control device is remotely located outside the vehicle 12 and is communicatively coupled to the vehicle 12 via any suitable communication interface. In another embodiments, the BLE enabled passive vehicle access control device is located in a network. The network can be, for example, a local-area network (LAN), a metropolitan area network (MAN), a wide area network (WAN), a primary network comprising multiple sub-networks located between the vehicle 12 and the external devices 14, a cloud network, and so forth. The yet embodiment, the BLE enabled passive vehicle access control device is located on a serer. The cloud network can be a public cloud network, a private cloud network, for example.

To increase the level of security in controlling the access to the vehicle and to defend the system 10 against relay attacks performed during the communication established between the vehicle 12 and the external device 14, a motion detector 28 disposed in the external device 14 is provided. The motion detector 28, in one embodiment, includes an accelerometer, and is configured to detect and distinguish among various types of motion and vibration. In some embodiments, the motion detector 28 includes a motion sensor, a gyroscope, a magnetometer, a vibration sensor, or any other suitable sensors. A desired program code in the form of a set of computer-executable instructions or data structures may be stored in the motion detector 28 and the instructions allow the motion detector 28 to detect and distinguish various types of motion and vibration. A processor coupled to the accelerometer 28 receives the measured information including acceleration data, compares the acceleration data with a set of pre-determined criteria as described in detail below, and distinguishes the acceleration data associated with a motion or vibration of the external device 14. Further, the processor analyzes the acceleration data to determine if a sequence of motion and vibration matches with a set of pre-determined criteria, i.e. an expected sequence of motion and vibration. A set of pre-determined criteria includes a significant or maximum motion, e.g. walking towards or away from the vehicle, a minimum motion, e.g. single step detection, a no motion, e.g. no change in location, a vibration mode, or so forth. If the sequence of motion and vibration does not match with the set of pre-determined criteria, a bi-directional communication between the vehicle 12 and the external device 14 is disabled, which in turn disrupts any relay attacks.

The motion detector 28 of the external device 14 or the processor located in the vehicle 12 may be configured to distinguish between a true motion event and a false motion event. For example, the processor located in the vehicle 12 receives the measured information including acceleration data from the motion detector 28, compares the acceleration data with a set of pre-determined criteria, and distinguishes the acceleration data between a true motion event and false motion event. If the event is determined to be a false motion event, i.e. the external device 14 is not moving, then the bi-directional communication between the vehicle 12 and the external device 14 is disabled to defend the vehicle 12 and the external device 14 against any relay attacks. The processor and the accelerometer may be integrated into the motion detector 28, in one example. In another example, the processor is located somewhere inside the external device 14 and is an independent component from the motion detector 28. In yet another example, the processor is located in the vehicle 12 and the motion detector 28 is communicatively coupled to the processor.

To provide another level of security in controlling the access to the vehicle and to defend the system 10 against relay attacks during the communication established between the vehicle 12 and the external device 14, a microprocessor 30 having a set of computer executable instructions including a TX power profiling is provided. During the connection and authentication phase, the external device 14 and the vehicle 12 transmit to each other several packets. For example, the transmitting device, such as the external device 14, modulates the transmit (TX) power level of successive transmissions according to a specific and secret pattern so to create at a receiving end of the communication link, such as the vehicle 12, an identical RX power (RSS) level profile that serves as an authentication before a connection between the external device 14 and the vehicle 12 is established. The receiving end of the communication link in the vehicle 12 measures the RX power (RSS) level of successive incoming signals, compares the RX power level of successive incoming signals with the pre-defined secure pattern stored in a machine readable medium. The machine readable medium may be located in either the vehicle 12, the external device 14, the network, or the server. If the RSS of the incoming signals is constant, a communication between the vehicle 12 and the external device 14 is disabled, which in turn disrupts any relay attacks. FIG. 2A shows the graph 40 of the constant RSS profile generated by an attacker. Now referring to FIG. 2B, a secret TX power profile generates a specific and secret RSS profile pattern illustrated as a graph 48. As can be seen, both vehicle 12 and external device 14 are able to detect the presence of a relay attack by measuring the power of the received signals and then comparing the resulting RSS profile with the pre-defined and secure TX power profile. In one embodiment, the same packet (message) is transmitted multiple times during the connection and authentication phase by varying transmit power level. In another embodiment, each packet (message) is transmitted during the connection and authentication phase by varying the transmit power level. In yet another embodiment, the transmit power level used to transmit the packet (message) may be added to the payload of the encrypted transmitted packet. The receiving end of the communication link in the vehicle 12 measures the RSS of the received packet and adds this value to the payload of the encrypted response packet. In turn, the transmitting device 14 further uses this information to adjust its own transmit power level to the same level.

Figure 3:
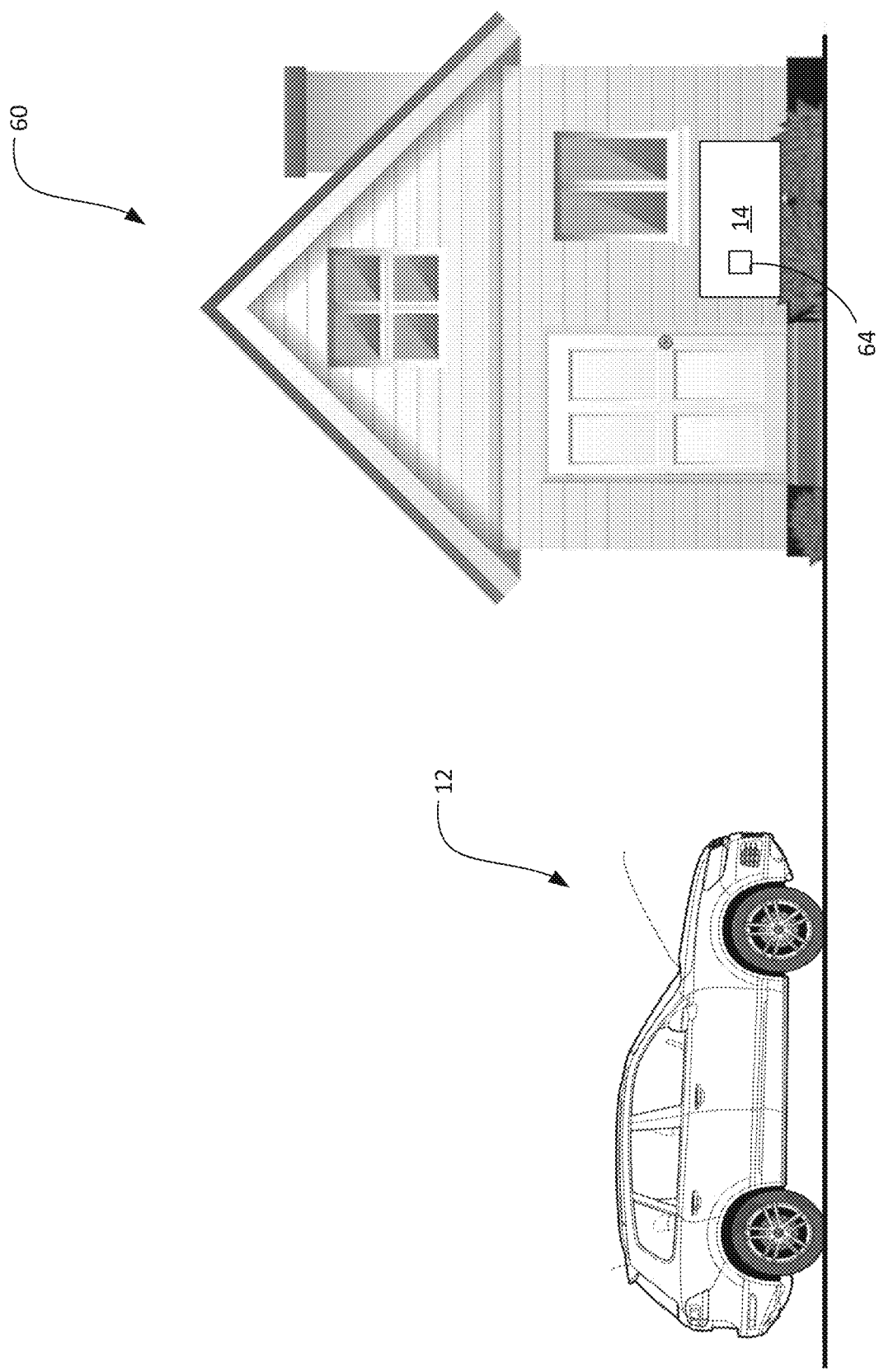
FIG. 3 is a block diagram of a system according to another described embodiment of the disclosure.

FIG. 3 illustrates another system 60 in accordance with a disclosure. The system 60 is identical to the system 10 illustrated in FIG. 1, except that the system 60 includes a barometric pressure sensor 64 configured to measure barometric pressure, which ultimately translates the measured barometric pressure into altitude value. If the altitude value of the vehicle 12 does not match with the altitude value of the external device 14, a bi-directional communication between the vehicle 12 and the external device 14 is disabled, which in turn disrupts any relay attacks. This altitude or barometric pressure reading process provides a level of security in controlling the access to the vehicle 12 and to defend the system 60 against relay attacks during the communication established between the vehicle 12 and the external device 14. In one embodiment, the barometric pressure sensor 64 is integrated into the motion detector 28. In another embodiment, the barometric pressure sensor 64 may be a separate component is communicatively coupled to the motion detector 28. A suitable program code in the form of a set of computer-executable instructions or data structures may be stored in the barometric pressure sensor 64 and the instructions cause the barometric pressure sensor 64 to measure barometric pressure level and compare the resulting altitude of the vehicle 12 and the external device 14. In some embodiments, a processor, previously described in FIG. 1, not only is capable of comparing the acceleration data collected by the accelerometer 28 with a set of pre-determined criteria and distinguishing the acceleration data associated with a motion or vibration of the external device 14, but the processor is also capable of comparing the altitude of the vehicle 12 and the external device 14.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context of particular embodiments. Functionalities may be separated or combined in blocks differently in various embodiments of the disclosure or described with different terminology. These and other variations, modifications, additions, and improvements may fall within the scope of the disclosure as defined in the claims that follow.

What is claimed is:

1. A Bluetooth Low Energy (BLE) passive vehicle access control system comprising:
   a wireless transceiver located in a vehicle;
   an external device configured to communicate with the wireless transceiver located in the vehicle; and
   a processor located in the external device;
   a barometric pressure sensor located in the external device, the barometric pressure sensor being configured to measure barometer pressure at the external device and send the measured barometric pressure to the wireless transceiver;
   wherein the processor located in the external device is configured to:
      modulate a transmitted (TX) power level of successive transmissions from the external device to the wireless transceiver in the vehicle using a predetermined pattern of power levels stored in a non-transitory computer-readable storage media in the external device and not received from the wireless transceiver so at least one transmission in the successive transmissions from the external device has a transmitted power level that is less than a preceding transmission in the successive transmissions from the external device; and
   wherein the wireless transceiver located in the vehicle is configured to:
      generate a RX power level (RSS) profile corresponding to a power level of each successive transmission received from the external device,
      compare the generated RSS profile with a predetermined pattern of power levels stored in a non-transitory computer-readable storage media in the vehicle and not received from the external device;
      disable communication between the external device and the wireless transceiver when the RSS profile does not match the predetermined pattern of power levels;
      receive the measured barometric pressure from the barometric pressure sensor and translate the measured barometric pressure to an altitude of the external device;
      compare the translated altitude of the external device to an altitude of the wireless receiver; and
      disable communication between the external device and the wireless transceiver located in the vehicle when the translated altitude of the external device does not match the altitude of the wireless receiver.

2. The BLE passive vehicle access control system of claim 1 further comprising:
   a motion detector located in the external device, the motion detector being configured to generate acceleration data corresponding to movement of the external device and transmit the generated acceleration data to the wireless transceiver; and
   the wireless transceiver is further configured to compare the acceleration data received from the motion detector in the external device with predetermined criteria stored in the non-transitory computer-readable storage media located in the vehicle and to determine whether the acceleration data corresponds to a true event or a false event.

3. The BLE passive vehicle access control system of claim 2 wherein the wireless transceiver disables communication between the external device and the wireless transceiver located in the vehicle when the wireless transceiver determines the acceleration data does not match with any of the predetermined criteria or determines the acceleration data corresponds to the false event.

4. An access control system for a vehicle comprising:
   a sensor for generating and transmitting data corresponding to a barometric pressure at an external device; and
   a processor in a vehicle that is configured to:

measure a RX power level (RSS) profile of successive transmissions received from the external device;

compare the measured RSS profile of the successive transmissions with a predetermined pattern of RX power levels, at least one of the power levels in the predetermined pattern of power levels being less than at least one preceding power level in the predetermined pattern of power level;

disable communication between the external device and the processor in the vehicle when the measured RSS profile of the successive transmissions does not match the predetermined pattern of RX power levels, receive the generated data corresponding to the barometric pressure transmitted from the sensor and translate the generated data corresponding to the barometric pressure transmitted from the sensor into an altitude value at the sensor;

compare the altitude value at the sensor with an altitude value at the vehicle; and disable communication between the external device and the processor in the vehicle when the altitude value at the external device and the altitude value at the vehicle do not match.

\* \* \* \* \*